United States Patent [19]

Grigo et al.

[11] Patent Number: 4,677,162

[45] Date of Patent: Jun. 30, 1987

[54] POLYCARBONATE BLENDS HAVING LOW GLOSS

[75] Inventors: Ulrich R. Grigo, Kempen, Fed. Rep. of Germany; Nelson R. Lazear, McMurray; Mark W. Witman, Pittsburgh, both of Pa.

[73] Assignee: Mobay Corporation, Pittsburgh, Pa.

[21] Appl. No.: 860,955

[22] Filed: May 8, 1986

Related U.S. Application Data

[63] Continuation-in-part of Ser. No. 485,353, Apr. 15, 1983, abandoned.

[51] Int. Cl.$^4$ .............................................. C08L 69/00
[52] U.S. Cl. ........................................ 525/67; 525/69; 525/80
[58] Field of Search .................. 525/67, 146, 147, 69, 525/80

[56] References Cited

U.S. PATENT DOCUMENTS

| Re. 28,723 | 2/1976 | Holder et al. | 260/873 |
|---|---|---|---|
| 3,130,177 | 4/1964 | Grabowski | 260/45.5 |
| 3,852,393 | 12/1974 | Furukawa et al. | 260/873 |
| 3,954,905 | 5/1976 | Margotte et al. | 260/873 |
| 3,988,389 | 10/1976 | Margotte et al. | 260/873 |
| 4,082,895 | 4/1978 | Backderf et al. | 428/412 |
| 4,205,140 | 5/1980 | Liebig et al. | 525/67 |
| 4,245,058 | 1/1981 | Liu | 525/148 |
| 4,260,693 | 4/1981 | Liu | 525/148 |
| 4,263,415 | 4/1981 | Liu | 525/148 |
| 4,263,416 | 4/1981 | Liu et al. | 525/148 |
| 4,299,928 | 11/1981 | Witman | 525/67 |
| 4,390,657 | 6/1983 | Liu | 524/504 |

Primary Examiner—Theodore E. Pertilla
Attorney, Agent, or Firm—Gene Harsh; Joseph C. Gil; Aron Preis

[57] ABSTRACT

The present invention is directed to a thermoplastic molding composition comprising a blend of an aromatic polycarbonate, a graft copolymer and an impact modifier graft characterized by its properties wherein combined are low gloss and high impact strength.

9 Claims, No Drawings

POLYCARBONATE BLENDS HAVING LOW GLOSS

CROSS REFERENCE TO RELATED APPLICATION

This application is a continuation-in-part of our copending application Ser. No. 485,353 filed Apr. 15, 1983, now abandoned.

FIELD OF THE INVENTION

The present invention is directed to a thermoplastic molding composition and, more particularly, to a composition comprising a polycarbonate resin and a graft copolymer.

SUMMARY OF THE INVENTION

The thermoplastic molding compositions of the invention comprising an aromatic polycarbonate resin, a graft copolymer of acrylonitrile-butadiene-styrene and an elastomeric impact modifier are characterized by their properties including the combination of low gloss, high ultimate strength and high impact strength at low temperatures.

BACKGROUND OF THE INVENTION

Compositions containing a blend of polycarbonate and ABS were disclosed in U.S. Pat. Nos. 3,130,177 and 3,852,393. Similar compositions were disclosed in U.S Pat. Nos. 3,954,905 and 3,988,389 to possess improved weld line strength.

Improved impact strength of polycarbonates by the incorporation of a graft elastomer has been the subject of numerous U.S. Patents, for instance U.S. Pat. Nos. 4,299,928, 4,245,058, Re. 28,723, 4,263,416, 4,263,415, 4,260,693 and 4,082,895 among others.

In some applications, notably power tool housing, business machine enclosures and automotive parts, the design requirements limit the permissible degree of gloss while at the same time specify a high degree of resistance to impact, especially as expressed in a relatively low sensitivity to notch effects.

The present invention discloses thermoplastic compositions eminently suitable for these applications.

Gloss, as a material property, is determined in accordance with ASTM D-528, Standard Method of Test for Specular Gloss, a method incorporated herein by reference.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have molecular weights of 10,000-200,000 (average molecular weight), preferably 20,000-80,000 and may have a melt flow rate per ASTM D-1238 at 300° C. of about 1 to about 24 gm/10 min., preferably about 2-6 gm/10 min. They may be prepared, for example, by the known diphasic interface process from a carbonic acid derivative such as phosgene and from dihydroxy compounds by polycondensation see German Offenlegungsschriften Nos. 2,063,050; 2,063,052; 1,570,703; 2,211,956; 2,211,957 and 2,248,817; French Pat. No. 1,561,518; and the monograph, H. Schnell, "Chemistry and Physics of Polycarbonates", Interscience Publishers, New York, 1964, all incorporated herein by reference.

In the present context, dihydroxy compounds suitable for the preparation of the copolycarbonates of the invention conform to the structural formulae (1) or (2)

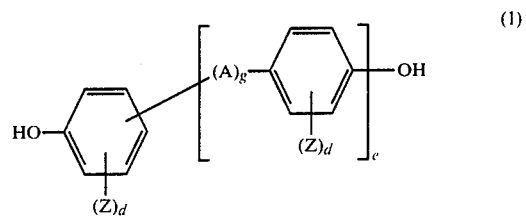

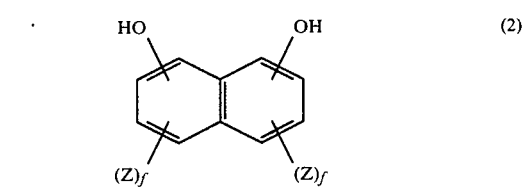

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —SO$_2$-radical; or a radical conforming to

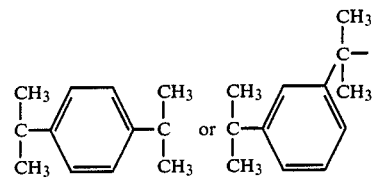

e and g both denote the number 0 to 1;
Z denotes F, Cl, Br or C$_1$-C$_4$-alkyl and if several Z radicals are substituents in one aryl radical, they may be identical or different;
d denotes 0 or an integer of from 1 to 4 and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,365; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl-benzene and 4,4'-sulfonyl diphenyl.

Examples of particularly preferred aromatic bisphenols are 2,2-bis-(4-hydroxyphenyl)-propane, 2,2-bis-(3,15-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

The polycarbonates of the invention may also be branched by incorporating small quantities of polyhydroxyl compounds in them by condensation, e.g., 0.05–2.0 mol % (based on the quantity of bisphenols used). Polycarbonates of this type have been described for example, in German Offenlegungsschrift Nos. 1,570,533; 2,116,974 and 2,113,374; British Pat. Nos. 885,442 and 1,079,821 and U.S Pat. No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)benzene; 1,1,1-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)propane and 1,4-bis-(4',4"-dihydroxytriphenylmethyl)-benzene. Some of the polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the trade name Merlon M-39, Merlon M-40 and Merlon M-50, all of which are bisphenol-A based polycarbonate resins differing in their respective molecular weights and characterized in that their melt indices per ASTM D-1238 are 12–24, 6–11.9 and 3.0–5.9 gm/10 min., respectively, all available from Mobay Corporation of Pittsburgh, Pa.

Graft Copolymers

In the context of the present practice, graft copolymers are ABS (acrylonitrile-butadiene-styrene) resins prepared by either bulk or bulk (mass) suspension polymerization (as distinguished from similar resins prepared by emulsion polymerization) characterized in that their polybutadiene content is about 1 to 18 percent by weight, more preferably about 3 to 15 percent by weight, and in that its average particle size is greater than 0.75, preferably between 0.8 to 15 microns.

Essentially, the molecules of ABS graft polymers consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

A specific conjugated diene monomer which may be utilized in preparing the backbone of the graft polymer is generically described by the formula:

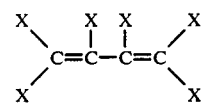

wherein X may be selected from the group consisting of hydrogen, alkyl groups containing from 1 to 5 carbon atoms, chloro and bromo. Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro- and bromo-substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinyl aromatic hydrocarbons. The preferred monovinyl aromatic monomers utilized are generically described by the formula:

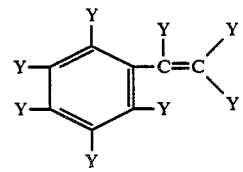

wherein Y may be selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cyclo-, aryl-, alkaryl-, alkoxy-, aralkyl-, aryloxy-, and other substituted vinyl aromatic compounds. Examples of such compounds are 3-methyl-styrene; 3,5-diethylstyrene and 4-n-propylstyrene, α-methylstyrene, α-methylvinyltoluene, α-chlorostyrene, vinyltoluene, α-bromostyrene, chlorophenyl ethylenes, dibromophenyl ethylenes, tetrachlorophenyl ethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. The acrylonitrile, substituted acrylonitrile or acrylic acid esters are described generically by the formula:

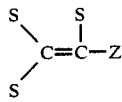

wherein S may be selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples of monomers of this description, i.e., acrylonitrile, substituted acrylonitrile, or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methacrylate, methylmethacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

In the preparation of the graft polymer, the conjugated diolefin polymer or copolymer exemplified by 1,3-butadiene polymer or copolymer comprises 1 to 18% by weight, preferably 3 to 18% by weight of the total graft polymer composition and the monomers polymerized in the presence of the backbone exemplified by styrene and acrylonitrile comprise about 82 to 99%, preferably 85 to 97% by weight of the total graft polymer composition.

Essentially, the ABS resins of the invention (described more fully in U.S. Pat. No. 3,852,393, the disclosure of which is incorporated herein by reference) are obtained by dissolving a butadiene type rubber, such as polybutadiene or a butadiene-styrene copolymer, in a mixture of a vinyl cyano compound represented, for example, by acrylonitrile and a vinyl aromatic hydrocarbon (including a halogenated compound) represented by styrene, polymerizing the mixture substantially under bulk polymerization conditions, although a small amount of water can be present in some cases, under sufficiently high agitation so as to shear the rubber being precipitated as polymerization advances until 10 to 40% by weight of vinyl cyano compound and vinyl aromatic compound are polymerized.

In the case of bulk suspension, water and a suspension stabilizer are then added to the polymerization system whereas in the case of the bulk process, the polymerization continues to a predetermined degree.

The Impact Modifying Graft

In the context of the present invention, the impact modifying graft is a rubber elastic based graft copolymer characterized in that its glass transition temperature is below 10° C., preferably below 0° C., and in that elastomeric content is about 15 to 98%, preferably from about 20 to about 95% by weight and in that its average particle size is less than 0.75 micron.

In the preferred grafts, a monomer mixture phase of from 95 to 50% by weight of styrene, methylmethacrylate or mixtures thereof and from 5 to 50% by weight of acrylonitrile is graft polymerized onto a rubber. In principle, any rubber may be used as the graft backbone so long as its properties meet the criteria set out above. Cross-linking of the rubber elastic phase is an optional feature of the impact modifier graft.

Particularly suitable rubbers are polybutadiene, butadiene/styrene copolymers having up to 30% by weight of copolymerized styrene, copolymers of butadiene and acrylonitrile with up to 20% by weight of a lower alkyl ester of an acrylic or a methacrylic acid for example, methylacrylate, ethylacrylate, methylmethacrylate and ethylmethacrylate or an acrylate based rubber such as $C_1$–$C_6$-alkyl acrylate, preferably a butylacrylate.

The weight ratio of rubber to graft polymerized monomers is generally within the range of from 85:15 to 40:60 and the impact modifier graft must be present in the molding composition in the form of particles which diameters may range from about 0.01 to about 5 microns provided, however, that the average value is less than 0.75 micron.

Graft copolymers of this kind are known. They are obtained, for example, by polymerizing the monomers on a rubber latex in the presence of a radical catalyst, and are available in commerce from for instance, Bayer AG of Leverkusen, West Germany.

Among the acrylate based grafts are the multiphase acrylic rubber interpolymer composites described in U.S. Pat. Nos. 3,808,180 and 4,096,202, both incorporated herein by reference. Briefly, the technology described therein is that of the preparation of a specific class of multiphase compounds. These are compositions comprising about 25 to 95% by weight of a first elastomeric phase and about 75 to 5% by weight of a second, rigid, thermoplastic phase. The first phase is polymerized from about 75 to 99.8% by weight $C_1$–$C_6$-acrylate resulting in an acrylic rubber core having a glass transition temperature below about 10° C., which is cross-linked with 0.1 to 5% by weight of a cross-linking monomer and to which is added 0.1 to 5% by weight of a graft-linking monomer.

The preferred alkyl acrylate is butyl-acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stage of polymerization and, consequently, at or near the surface of the elastomer particles. The preferred graft-linking monomer is allyl methacrylate and diallyl maleate.

The final stage monomer system can be comprised of $C_1$–$C_6$-methacrylate, styrene, acrylonitrile, alkyl acrylates, alkyl methacrylate, dialkyl methacrylate and the like, as long as the over Tg is at least 20° C. Preferably, the final stage monomer system is at least 50% by weight $C_1$–$C_4$-alkyl methacrylate. It is further preferred that the final state polymer be free of units which tend to degrade poly(alkylene terephthalate); for example, acid hydroxyl amino and amide groups.

A certain such acrylic rubber interpolymer composite characterized in that acrylic rubber core is comprised of n-butyl-acrylate and in that its crosslinking agent is 1,3-butylene diarylate and in which the graft-linking agent is diallyl maleate and the second phase monomeric system of which is methyl methacrylate is noted to be particularly suitable in the present context.

The compositional makeup of the preferred interpolymer compound is described by the weight ratios of its constituent monomers as follows: n-butylacrylate/1,3-butylene diacrylate/diallyl maleate/methylmethacrylate - 79.2/0.4/0.4/20.0.

A suitable acrylic rubber interpolymer composite is available under the trade name Acryloid KM-330 from Rohm & Haas Company of Philadelphia, Pa.

The thermoplastic molding compositions of the invention comprise a blend containing 20 to 95 phr of polycarbonate resin, 3 to 78 phr of the graft copolymer and a 2 to 40 phr of the impact modifying graft; a corresponding preferred set of ranges is 30 to 80 phr of polycarbonate, 10 to 60 of the graft copolymer and 5 to 30 of the impact modifying graft.

In addition to the components of the composition of the invention, as noted above, the composition may contain mold release agents, pigments, dies, flame retardants, stabilizers to heat and moisture as well as fillers and reinforcing agents of the types known in the art.

The preparation of the composition of the invention follows a procedure comprising dry blending of the ingredients followed by extrusion and pelletizing by means well established in the art and exemplified below.

The invention will be illustrated but is not intended to be limited by the Examples below. In all the examples described below, except where noted otherwise, the graft polymer was an ABS resin prepared by bulk suspension having a butadiene content of about 7.5–8% by weight and the polycarbonate resin was a bisphenol-A homopolycarbonate having a melt flow index of about 6 to 11.9 gm/10 min. Also, the polybutadiene based impact modifiers identified as A, C, D and G used in the examples below were characterized in that their glass transition temperature is −85° C. and in that their average particle size is below 0.4 microns.

EXAMPLES 1–7

Compositions in accordance with the invention were prepared and their properties determined as is summarized below in Table 1. The blended components were extruded (2" MPM-Extruder, Compression ratio 2.75:1, screen pack 20-40-60-20) at a temperature profile (rear to front): 270°/280°/270°/255°/245°/265°/265° C. The compositions were injection molded into test specimens at 450° F. In addition to the components noted in the Table, a thermal stabilizer described generally in DOS No. 2,929,229 was incorporated in the composition at a level of 0.2%. No criticality in the context of the present invention is assigned to the addition of said stabilizer.

TABLE 1

|  | Control 1 | 2 | 3 | 4 | 5 | 6 | 7 |
|---|---|---|---|---|---|---|---|
| Polycarbonate, pbw | 60.0 | 60.0 | 60.0 | 60.0 | 60.0 | 60.0 | 60.0 |
| Graft polymer, pbw | 40.0 | 35.0 | 30.0 | 25.0 | 35.0 | 30.0 | 25.0 |
| Impact modifier, pbw | | | | | | | |
| C[1] | — | 5.0 | 10.0 | 15.0 | — | — | — |
| D[2] | — | — | — | — | 5.0 | 10.0 | 15.0 |
| Melt index, gm/10 min. | 13.2 | 10.7 | 9.3 | 9.5 | 11.3 | 10.6 | 8.4 |
| Gloss[3] | low | low | low | low | low | low | some |
| Impact strength, Izod Notched | | | | | | | |
| ⅛" r.t. | 11.4 | 14.0 | 13.2 | 12.1 | 13.5 | 13.3 | 11.9 |
| −20° C. | 2.6 | 3.4 | 4.9 | 7.6 | 6.8 | 7.3 | 8.4 |
| −30° C. | 1.9 | 2.9 | 3.7 | 3.8 | 3.1 | 7.1 | 6.5 |
| −40° C. | 2.1 | 2.3 | 2.9 | 2.8 | 3.4 | 3.5 | 4.7 |
| Heat deflection temperature at 264 psi, °C. | 109.4 | 111.1 | 109.6 | 104.5 | 105.8 | 111.0 | 103.9 |

[1] C denotes a graft consisting of 20% polybutadiene and 80% SAN (S/AN ratio 72/28)
[2] D denotes a graft consisting of 50% polybutadiene grafted with 50% SAN (S/AN ratio 72/28)
[3] determined by observation.

EXAMPLES 8–15

Compositions in accordance with the invention were prepared and their properties determined as is summarized below in Table 2. The blended components were extruded (2" MPM-Extruder; compression ratio 2.75:1, screen pack 20-40-60-20) at a temperature profile of (rear to front) 270°/280°/270°/255°/245°/265°/°265° C. The compositions were injection molded into test specimens at 450° F. except as noted below. All the compositions were noted to yield specimens characterized by their low gloss.

TABLE 2

|  | 8 | 9 | 10 | 11 | 12 | 13 | 14 | 15 |
|---|---|---|---|---|---|---|---|---|
| Polycarbonate, pbw | 60.0 | 60.0 | 60.0 | 63.15 | 50.0 | 50.0 | 50.0 | 50.0 |
| Graft polymer, pbw | 30.0 | 25.0 | 30.0 | 26.32 | 37.5 | 32.0 | 37.5 | 32.0 |
| Impact modifier, pbw | | | | | | | | |
| A[1] | 10.0 | 15.0 | — | — | 12.5 | 18.0 | — | — |
| B[2] | — | — | 10.0 | 10.53 | — | — | 12.5 | 18.0 |
| Melt Index | 6.9 | 5.2 | 6.7 | 5.9 | 6.9 | 4.7 | 6.8 | 6.2 |
| Impact strength, notched Izod ft. lb/in. | | | | | | | | |
| Specimens tested at room temperature | | | | | | | | |
| Specimens molded at 450° F. | | | | | | | | |
| ⅛" | 15.8 | 16.0 | 13.6 | 12.2 | 12.3 | 13.7 | 11.7 | 10.8 |
| ¼" | 10.7 | 10.7 | 10.3 | 9.7 | 12.0 | 9.7 | 10.3 | 8.9 |
| 475° F. | | | | | | | | |
| ⅛" | 12.6 | 13.6 | 12.3 | 10.8 | 16.2 | 13.8 | 11.9 | 10.2 |
| ¼" | 10.0 | 10.8 | 9.9 | 9.7 | 10.9 | 9.8 | 8.9 | 8.2 |
| 500° F. | | | | | | | | |
| ⅛" | 13.0 | 12.6 | 12.4 | 10.9 | 12.4 | 12.9 | 10.8 | 10.4 |
| ¼" | 10.1 | 10.5 | 9.8 | 9.8 | 9.7 | 9.9 | 9.0 | 8.6 |
| 525° F. | | | | | | | | |
| ⅛" | 12.1 | 12.3 | 11.6 | 11.2 | 13.3 | 11.9 | 10.9 | 9.5 |
| ¼" | 10.3 | 10.5 | 9.5 | 9.3 | 9.8 | 9.9 | 7.8 | 7.9 |
| Tested at: ⅛" | | | | | | | | |
| −20° C. | 7.9 | 9.6 | 8.2 | 8.4 | 8.9 | 8.8 | 7.2 | 7.0 |
| −30° C. | 5.8 | 8.3 | 6.0 | 7.6 | 6.6 | 7.6 | 6.8 | 5.4 |

TABLE 2-continued

|  | 8 | 9 | 10 | 11 | 12 | 13 | 14 | 15 |
|---|---|---|---|---|---|---|---|---|
| −40° C. | 3.8 | 7.2 | 5.4 | 6.7 | 3.4 | 5.9 | 4.0 | 4.8 |
| Heat deflection temperature °C., at 264 psi | 115.2 | 115.1 | 119.0 | 116.5 | 107.0 | 106.7 | 109.2 | 109.8 |

(1)A denotes a graft consisting of 80% polybutadiene grafted with 20% SAN (S/AN ratio being 72/28), the average particle size is about 0.3 to 0.5 microns.
(2)B denotes Acryloid KM-653 which is an MBS System (methylmethacrylate butadiene-styrene copolymer); a product of Rohm & Haas, characterized in that the Tg of the rubber phase is below −50° C.

EXAMPLES 16-19

The compositions noted below were prepared and tested in much the same way as was described above. Except for composition 19, a small amount (0.3 pbw) of a thermal stabilizer of the type described in DOS No. 2,929,229 was added to the compositions. No criticality is ascribed to that addition in the present invention.

TABLE 3

|  | Control 16 | 17 | 18 | 19 |
|---|---|---|---|---|
| Polycarbonate, pbw | 60.0 | 60.0 | 50.0 | 50.0 |
| Graft polymer, pbw | 30.0 | 40.0(1) | 37.5 | 37.5 |
| Impact modifier D(2), pbw | 10.0 | — | 12.5 | 12.5 |
| Melt index, gm/10 min. | 9.2 | very high | 10.0 | 9.4 |
| Gloss | some | high | some | very low |
| Heat deflection temperature at 264 psi, °C. | 114.5 | 113.1 | 103.2 | 104.3 |
| Impact strength, Izod notched, ft. lb/in. |  |  |  |  |
| ⅛" r.t. | 16.3 | 12.4 | 15.6 | 12.4 |
| −20° C. | 9.7 | 3.8 | 7.1 | 9.5 |
| −30° C. | 6.2 | 1.3 | 3.6 | 4.8 |
| −40° C. | 2.9 | 1.1 | 2.4 | 2.7 |

(1)Novodur PK - Emulsion ABS, containing 30% polybutadiene and 70% SAN (S/AN = 72/28), particle size average about 0.4 microns, Tg of the rubber phase is −85° C., Commercial Product of Bayer AG.
(2)An impact modifier graft consisting of 50% polybutadiene and 50% SAN (S/AN = 72/28).

As may be readily appreciated, the addition of the impact modifiers of the invention have a most profound effect on the low temperature impact performance of the blends of polycarbonate and graft polymer. This is particularly unexpected in view of the decline, or at best the marginal improvement, in room temperature impact strength of these compositions.

The compositions of the invention are further noted to be of a characteristically low gloss.

EXAMPLES 20-24

Further compositions in accordance with the invention were prepared and their properties determined as noted below. The blended components were extruded (ZSK 53, 100-110 rpm, 90-100 lbs/hr) at a temperature profile (rear to front): 270°/250°/235°/240°/235°/240° C. The compositions were injection molded at 450° F. except as noted.

TABLE 4

|  | Control | 20 | 21 | 22 | 23 | 24 |
|---|---|---|---|---|---|---|
| Polycarbonate, pbw | 60.0 | 60.0 | 60.0 | 60.0 | 52.0 | 60.0 |
| Graft polymer, pbw | 40.0 | 30.0 | 30.0 | — | 48(1) | 30.0 |
| Impact modifier, pbw |  |  |  |  |  |  |
| G(3) | — | 10.0 | — | — | — | — |
| D(4) | — | — | 10.0 | 24.0 | — | — |
| KM 330 | — | — | — | — | — | 10.0 |
| SAN CN 51(2) | — | — | — | 16.0 | — | — |
| Polybutadiene content (%) | 3.2 | 9.9 | 7.4 | 12.0 | 9.0 | 2.4 |
| Melt Index (gm/10 min.) | 12.9 | 7.5 | 8.7 | 6.0 | 5.2 | 9.0 |
| HDT at 264 psi, °C. | 110.3 | 109.5 | 112.7 | 115.2 | 113.6 | 111.2 |
| Gardner impact, in. lb. |  |  |  |  |  |  |
| room temperature | 440.0 | 380.0 | 395.0 | 354.0 | 363.0 | 368.0 |
| at −29° | 292.0 | 290.0 | 330.0 | 339.0 | 344.0 | 288.0 |
| Gloss (60°) % | 52.0 | 45.0 | 61.9 | 95.6 | 95.5 | 68.0 |
| Ultimate elongation, % | 70.0 | 120.0 | 120.0 | 100.0 | 30.0 | 110.0 |
| Notched Izod Impact (ft. lb./in.) specimens tested at room temperature |  |  |  |  |  |  |
| Molded at 450° F., |  |  |  |  |  |  |
| ⅛" | 11.6 | 13.1 | 13.2 | 11.8 | 11.3 | 12.7 |
| ¼" | 9.2 | 10.5 | 10.4 | 10.0 | 9.2 | 9.8 |
| 475° F., |  |  |  |  |  |  |
| ⅛" | 11.7 | 12.5 | 12.8 | 11.5 | 11.3 | 15.9 |
| ¼" | 9.0 | 10.4 | 10.5 | 9.3 | 8.9 | 10.4 |
| 500° F., |  |  |  |  |  |  |
| ⅛" | 11.3 | 11.9 | 12.2 | 10.8 | 9.9 | 12.3 |
| ¼" | 8.8 | 10.0 | 10.5 | 9.4 | 7.4 | 11.3 |
| 525° F., |  |  |  |  |  |  |
| ⅛" | 11.8 | 11.2 | 11.9 | 10.0 | 8.0 | 12.1 |
| ¼" | 8.7 | 9.9 | 9.9 | 8.3 | 3.1 | 11.0 |
| Notched Izod in. lb./ft. |  |  |  |  |  |  |
| ⅛" |  |  |  |  |  |  |
| at −20° C. | 2.3 | 12.6 | 9.9 | 9.1 | 7.2 | 7.5 |
| at −30° C. | 1.7 | 10.8 | 8.2 | 7.5 | 2.7 | 5.2 |
| at −40° C. | 1.3 | 4.8 | 5.7 | 7.9 | 2.4 | 3.5 |

(1)Blendex 206 - Emulsion ABS, a product of Borg-Warner - characterized in that its average particle size is about 0.1–0.2 microns and in that its polybutadiene content is about 18%.
(2)SAN CN 51 - styrene acrylonitrile copolymer - a product of Monsanto having a S/AN ratio of about 3:1.
(3)denotes an impact modifier graft containing 75% polybutadiene grafted with 25% SAN (S/AN - 72/28). The average particle size is about 0.3 to 0.5 microns.
(4)denotes an impact modifier graft containing 50% polybutadiene grafted with 50% SAN (S/AN - 72/28). The average particle size is about 0.3 to 0.5 microns.

The results presented in Table 4 clearly indicate that the compositions in accordance with the invention, i.e., 20 and 21 feature an attractive combination of good impact properties, low gloss values and high ultimate elongation as compared with either the control or with compositions 22 and 23.

EXAMPLES 25-26

A further comparison demonstrating the invention is presented below.

The ABS of composition 26 was prepared by diluting, with SAN, a commercial ABS resin which was prepared by emulsion. The dilution was carried out by extruding the mixture of that ABS (Novodur PK, from Bayer AG) with SAN, in a 2" MPM single screw extruder, 2.75:1 compression ratio screw and a 20-40-60-20 screen pack. The temperature profile was set to 200°/200°/210°/210°/215°/215° C. (front to rear) and the pellets then dried and used as feedstock for the preparation of Example 26.

The composition of Examples 25 and 26 were extruded under similar conditions and equipment as above except that the temperature profile was set to 270°/280°/270°/255°/245°/265°/265° C. (front to rear). The pellets were dried and test specimens were injection molded at 475° F.

TABLE 5

| Composition, wt. percent | 25 | 26 (control) |
|---|---|---|

TABLE 5-continued

| | | |
|---|---|---|
| Polycarbonate resin | 60 | 60 |
| ABS resin of the invention | 30 | — |
| ABS resin not of the invention | — | 30 |
| Impact modifier[(2)] | 10 | 10 |
| 60° gloss, % | 58 | 98 |
| Impact strength, Notched Izod, ft-lb/in, ⅛" | | |
| at room temperature | 12.3 | 11.5 |
| at −30° C. | 10.4 | 10.2 |

The ABS resin of the invention used in Example 25 was practically identical to the ABS resin of Example 26 in terms of their butadiene content (7.5–8%). The difference between these resin stemmed from their respective method of preparation. The resin of Example 25 was prepared by bulk suspension and its average particle size was about 3 micron while the resin of Example 26 was prepared by emulsion polymerization and its particle size averaged about 0.4 microns. While the impact strength advantage is small, the advantage in terms of gloss values is indeed significant.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of
   (i) an aromatic polycarbonate, resin,
   (ii) an acrylonitrile butadiene styrene graft copolymer prepared by bulk or mass suspension polymerization characterized in that its polybutadiene content is about 1 to 18% relative to its weight and in that its average particle size is greater than 0.75 micron and
   (iii) an impact modifying graft consisting of a rubber elastic phase and a grafted on phase characterized in that its glass transition temperature is less than 10° C. and in that the content of its elastomeric phase is 15 to 98% relative to its weight and in that its average particle size is less than 0.75 micron.

2. The composition of claim 1 wherein said (i) is present at an amount of from 20 to 90%, said (ii) is present at an amount of from 3 to 78% and said (iii) is present at an amount of from 2 to 40%, said percents being in relation to the weight of said blend.

3. The composition of claim 2 wherein said (i) is a bisphenol A based on polycarbonate resin.

4. The composition of claim 2 wherein said (ii) is further characterized in that its polybutadiene content is about 3 to 15% by weight.

5. The composition of claim 4 wherein said (ii) is further characterized in that its said average particle size is between 0.8 and 15 microns.

6. The composition of claim 1 wherein said (iii) is characterized in that its glass transition temperature is below 0° C.

7. The composition of claim 1 wherein said (iii) is characterized in that said content of said elastomeric phase is about 20 to 95% by weight.

8. The composition of claim 6 wherein said temperature is less than −50° C.

9. A thermoplastic molding composition comprising a resinous blend of (i) 30 to 80 phr of a polycarbonate resin, (ii) 10 to 60 phr of an acrylonitrile butadiene styrene graft copolymer prepared by bulk or mass suspension polymerization characterized in that its buatadiene content is about 3 to 15 percent by weight and in that its average particle size is about 0.8 to 15 microns and (iii) 5 to 30 phr of an impact modifying graft consisting of a rubber elastic phase and a grafted-on phase characterized in that the glass transition temperature of the rubbery phase is less than −50° C. and in that the content of its rubber phase is about 20 to about 95 percent relative to its weight and in that its average particle size is less than 0.75 microns.

* * * * *